(12) United States Patent
Day et al.

(10) Patent No.: US 9,114,891 B2
(45) Date of Patent: Aug. 25, 2015

(54) MULTI-PURPOSE ELECTRICAL COIL AS A MAGNETIC FLUX GENERATOR, HEATER OR DEGAUSS COIL

(75) Inventors: Christopher Alan Day, Westminster, CA (US); Jeffrey Jacob Brown, Rancho Santa Margarita, CA (US); Kenneth Maxwell Hays, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 1040 days.

(21) Appl. No.: 13/324,609

(22) Filed: Dec. 13, 2011

(65) Prior Publication Data

US 2013/0148250 A1    Jun. 13, 2013

(51) Int. Cl.
| | | |
|---|---|---|
| H01F 38/00 | (2006.01) |
| B64G 1/00 | (2006.01) |
| H05B 3/00 | (2006.01) |
| B64G 1/32 | (2006.01) |
| B64G 1/50 | (2006.01) |
| B64G 1/26 | (2006.01) |
| G05D 1/08 | (2006.01) |

(52) U.S. Cl.
CPC .. *B64G 1/32* (2013.01); *B64G 1/50* (2013.01); *B64G 1/26* (2013.01); *G05D 1/0883* (2013.01)

(58) Field of Classification Search
CPC ............ B64G 1/36; B64G 1/32; B64G 1/365; B64G 1/283; B64G 1/285; B64G 1/366; B64G 1/288

USPC ................... 361/149; 701/13, 3, 4, 123, 226; 244/166; 318/647
See application file for complete search history.

(56) References Cited

U.S. PATENT DOCUMENTS

| | | | | |
|---|---|---|---|---|
| 4,114,841 | A  * | 9/1978  | Muhlfelder et al. | 244/166 |
| 5,650,983 | A  * | 7/1997  | Kondo et al. | 369/13.17 |
| 6,076,772 | A  * | 6/2000  | Eyerly et al. | 244/164 |
| 6,231,011 | B1 * | 5/2001  | Chu et al. | 244/165 |
| 6,292,722 | B1 * | 9/2001  | Holmes et al. | 701/13 |
| 6,380,657 | B1 * | 4/2002  | Roth | 310/216.001 |
| 6,437,653 | B1 * | 8/2002  | Cruz et al. | 331/181 |
| 6,634,603 | B2 * | 10/2003 | Cooper | 244/166 |
| 6,734,404 | B2 * | 5/2004  | Hays | 219/552 |
| 7,801,457 | B2 * | 9/2010  | Seo et al. | 399/69 |
| 7,898,120 | B2 * | 3/2011  | Sheahan et al. | 310/12.14 |
| 8,084,726 | B2 * | 12/2011 | Hanlon et al. | 244/3.22 |
| 2003/0042570 | A1 * | 3/2003 | Hanks | 257/531 |
| 2006/0169042 | A1 * | 8/2006 | Hulsing | 73/510 |
| 2008/0099626 | A1 * | 5/2008 | Bialke | 244/165 |
| 2008/0258720 | A1 * | 10/2008 | Goldfine et al. | 324/240 |
| 2011/0073587 | A1 * | 3/2011 | Yoshihara et al. | 219/619 |
| 2011/0204473 | A1 * | 8/2011 | Subramanian | 257/531 |
| 2011/0225980 | A1 * | 9/2011 | Cheng et al. | 62/3.1 |

* cited by examiner

*Primary Examiner* — Rexford Barnie
*Assistant Examiner* — Elim Ortiz
(74) *Attorney, Agent, or Firm* — Thompson Hine LLP

(57) ABSTRACT

A method and system of using a common set of coils to provide at least two of magnetic flux, heat and degaussing in a mobile platform are provided. In accordance with one embodiment, the method involves oscillation of current in the coils at a frequency higher than a defined pointing requirement to provide heat. In accordance with another aspect, the coil functions as a degausser by energizing the coil with an oscillating current that decreases in amplitude over time.

17 Claims, 7 Drawing Sheets

MULTI-PURPOSE ELECTRICAL COIL AS A MAGNETIC FLUX GENERATOR, HEATER OR DEGAUSS COIL

FEDERALLY SPONSORED RESEARCH OR DEVELOPMENT

This invention was made with Government support under NRO000-10-C-173 awarded by the Department of Defense. The Government has certain rights in this invention.

FIELD

This application relates to a multipurpose electrical coil as a magnetic flux generator, heater or degaussing coil and, more particularly, to a method of using a common set of coils to provide magnetic flux, heat and/or degaussing in a mobile platform.

BACKGROUND

In the operation of a stabilized orbiting satellite there is always a need to control or limit uncontrolled tumbling of the spacecraft. Such uncontrolled motion of a satellite, intended to be stabilized in orbit, renders the satellite effectively useless for its planned operation. Furthermore, prolonged tumbling at excessive angular momentum may jeopardize the structural integrity of the spacecraft as well as the spacecraft's thermal and power balance. Therefore, it is desirable that recovery of the satellite occur within a short period of time after tumbling begins.

Control of tumbling can be accomplished by mass expulsion devices such as, rocket thrusters or jets. The use of such devices to control or limit spacecraft tumbling often requires excessive propellant usage. In the situation where no propellant is available, such means cannot be used to stabilize the spacecraft. Where electrical power in the satellite is available, it is more desirable to control tumbling by changing the spacecraft's spin rate by an autonomous control system.

Magnetic torquing of stabilized satellites, in particular for changing the attitude of a spacecraft that has deviated from its desired orientation relative to its orbit, is known. Such magnetic torquing systems use a magnetic field from torquers such as coils or electromagnets to interact with the magnetic field of the earth to develop a reaction torque. This reaction torque causes the reference axis of the satellite to be reoriented an amount proportional to the torquing time and flux magnitude. Magnetic torquing can also be used to develop a reaction torque to control the spin rate and the angular momentum of a spacecraft. These known magnetic torquing systems may be implemented in a satellite or spacecraft with an automatic (e.g., closed-loop) control system or an open-loop control system requiring command signals from a ground-situated station.

Most electronic devices experience changes in operating characteristics based on their operating temperature. For most applications, these variations are slight and can either be ignored or compensated for through calibration. However, there are instances in which environmental temperature regulation is required to ensure proper operation of an electronic device. For example, in many space applications where unregulated temperatures would be extremely cold, environmental temperature regulation is required. At these extreme temperatures, electronic components may have operating characteristics that are quite different from their operating characteristics at room temperature causing them to malfunction or provide erroneous readings. Further, temperature regulation is also typically required for components of any sort that are particularly sensitive to variations in temperature.

In many applications, strip heaters are used in temperature control systems for providing heat to electronic devices. Strip heaters include a resistive element that generates heat when a current is applied thereto. The heating element is typically either an elongated wire or trace of resistive material deposited on a substrate. The heating element is typically arranged in a pattern over a defined area to provide uniform heat over the defined area. When current is applied to the heating element, heat is emitted from the strip heater.

While strip heaters are considered an inexpensive and efficient means of providing heat to electronic devices for environmental temperature control, there are some drawbacks to these devices. Specifically, in spacecraft applications strip heaters add mass to the overall system. Minimizing the mass of a spacecraft is key to controlling the high launch expense.

In addition to heaters, satellites and other mobile platforms typically include separate degaussing coils for minimizing residual magnetism in equipment on the device. Having separate devices for magnetic flux generation, heating and degaussing adds complexity and mass to the mobile platform.

Therefore, it would be desirable to have a method and device that provides for magnetic flux generation, heating and degaussing that is less complex and requires less mass than those systems utilizing separate devices for some or all of these three functions.

SUMMARY

In one aspect, a method of using a common set of coils to provide at least two of magnetic flux, heating and degaussing in a mobile platform is provided. In accordance with one embodiment, the method involves oscillation of current in the coils at a frequency higher than a defined pointing stability requirement to provide heat. In accordance with another aspect, the coil is energized with an oscillating current that decreases in amplitude over time that enables the coil to serve as a degausser.

In another aspect, a system comprising a coil in a mobile platform is provided. The system includes a coil, a power supply for the coil, and a control circuit wherein the control circuit is programmed to operate the coil as a magnetic flux generator, a heater and/or a degausser. In accordance with particular aspects, the coil contains conductive traces.

In another aspect, the coil comprises conductive traces on a printed circuit board. The traces may be present on a single layer or on multiple layers.

The features, functions, and advantages that have been discussed can be achieved independently in various embodiments of the present invention or may be combined in yet other embodiments further details of which can be seen with reference to the following description and drawings.

DETAILED DESCRIPTION

Figure 1:
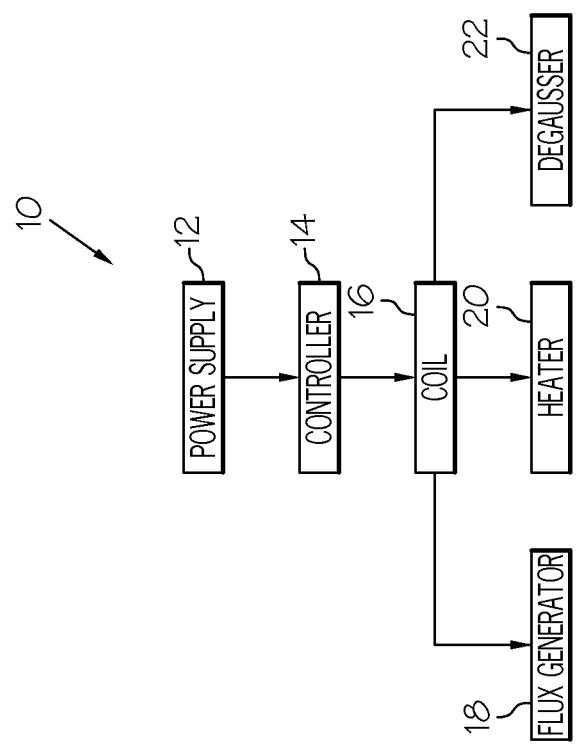
FIG. 1 is a block diagram illustrating one aspect of the disclosed system for utilizing a single set of coils as a magnetic flux generator, heater and degausser in accordance with one embodiment of the present disclosure.

Referring to FIG. 1, one aspect of the disclosed system 10 includes a power supply 12 that provides inputs (e.g., current, voltage, power) to a controller 14. In one example, the controller 14 may be an active or passive voltage or current or power output source that adjusts a voltage, current, and/or power level from its input to its output in accordance with control inputs (e.g., sensor data acquired from a mobile platform (e.g., car, boat, plane, spacecraft, or the like)). In one embodiment, the controller 14 energizes the electrical coil 16 (coil 16) to provide the desired functionality on the mobile platform (e.g., satellite 190 illustrated in FIG. 5).

Figure 2:
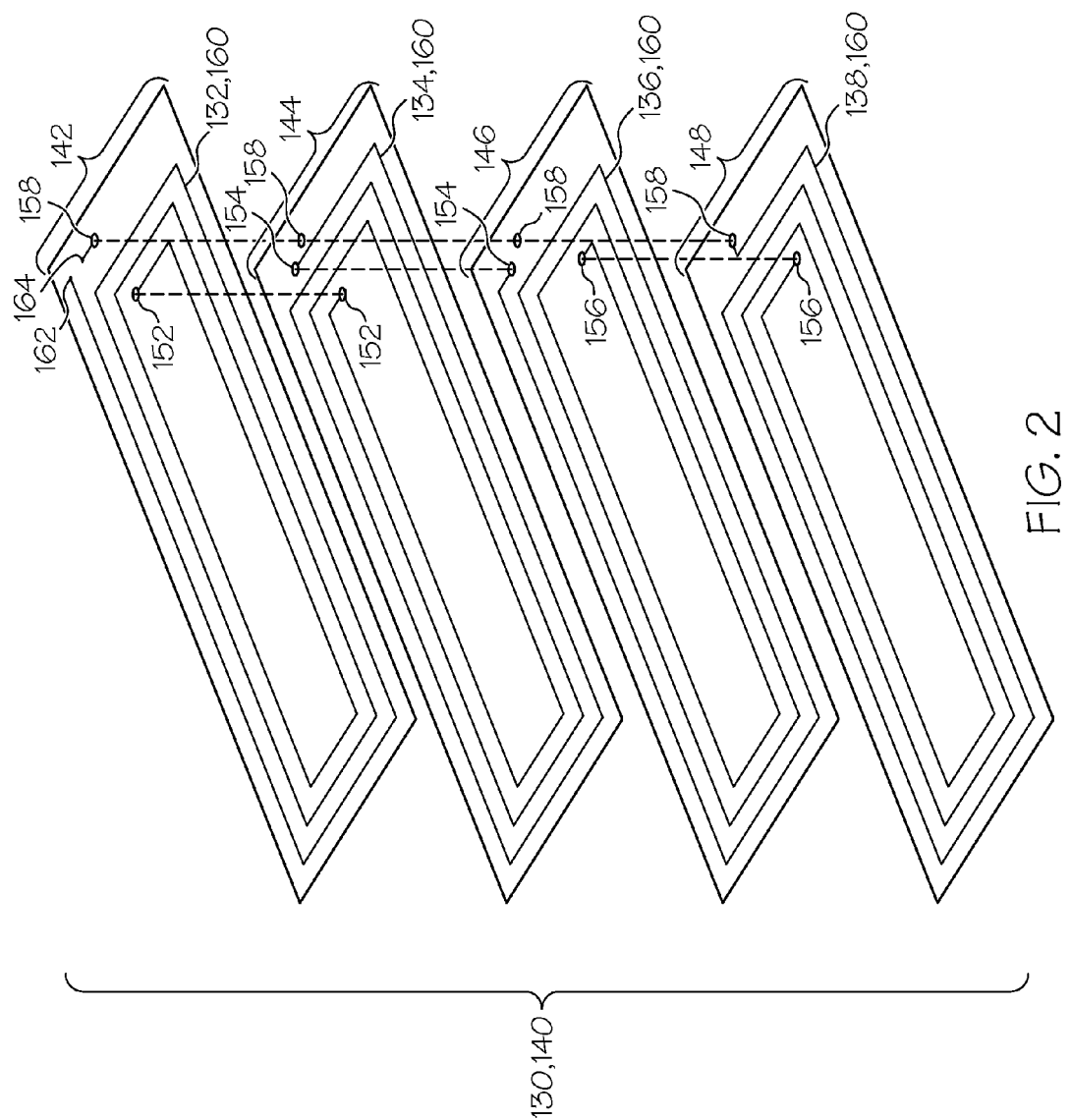
FIG. 2 is a diagram illustrating the single set of coils of FIG. 1 as an electrical coil disposed on multi-layers of a printed circuit board.
Figure 3:
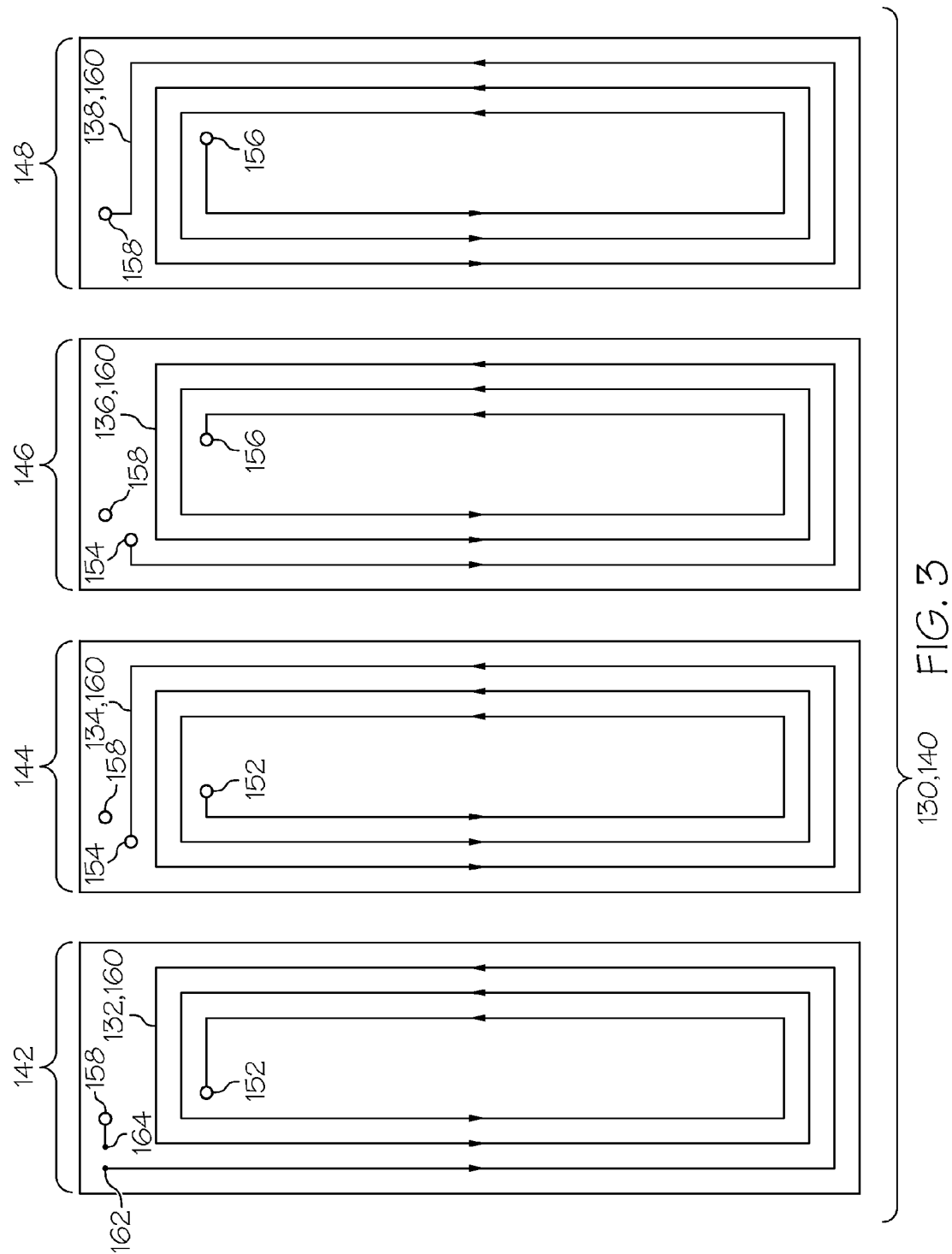
FIG. 3 is a diagram illustrating a side-by-side layer display of the electrical coil disposed on multi-layers of a printed circuit board of FIG. 2.

In one embodiment, the electrical coil 16 (e.g., coil 160) includes a multi-layer printed circuit board 140 as illustrated in FIGS. 2 and 3 to provide multi-function capability on a mobile platform (e.g., satellite 190). For instance, the controller 14 applies a level of direct current (DC) to the coil 16 (e.g., coil on multi-layer printed circuit board 140 of FIGS. 2 and 3) to generate a pre-determined level of magnetic flux and become a flux generator 18 (e.g. magnetic flux generator). In one embodiment, in accordance with spacing and length of traces of the coil 160, the coil 160 may produce magnetic flux such that its magnetic dipole moment is in a range of about 0.1 to 10 ampere-meters$^2$ that flux varies in accordance with, for instance, a distance from the coil 160 (e.g., of multi-layer board 140). As such, the coil 160 operates as a typical electromagnet that provides magnetic flux on the mobile platform (e.g., satellite 190).

In one embodiment, the controller 14 applies alternating current (AC) to the coil 16 to generate heat (e.g., becomes a heater 20) for components (e.g., electronic boards) on the mobile platform. For instance, in one embodiment, the controller 14 supplies alternating current (AC) at a frequency sufficiently high that the average magnetic flux generated is negligible (e.g., the average magnetic field based on switching of magnetic fields for a period of time is negligible).

When the coil 16 is operated as a typical electromagnet, it may be used to produce torque in a mobile platform such as a satellite 190. Current passing through the coil generates a magnetic field to reposition a satellite into a particular orientation. As such, the coil 16 may be used to provide magnetic torquing in conjunction with satellites. Examples of such methods and systems are described in U.S. Pat. No. 4,114,841 to Muhlfelder et al., the contents of which are hereby incorporated by reference.

In the heating function of the coil 16, a high frequency alternating current is supplied to the coil to generate heat while avoiding magnetization of the satellite. The frequency required to generate sufficient heat with negligible average magnetic flux would be dependent upon the mass and responsiveness of the satellite. Typically, the frequency may range from about 1 mHz to 1 KHz, with frequencies near 1 Hz being particularly useful. Typically, the heater will be operated at a few watts depending on the rate at which the satellite radiates heat away into space. Advantageously, as compared to many conventional spacecraft strip heaters having thin copper traces laminated with foil and taped to the substrate that may exhibit trace "lift-off" due to thermal expansion and contraction during heater operation, in this disclosure, the coil 16 may be fabricated using photolithographic processes within the printed circuit board (PCB) to prevent trace separation from the PCB.

In yet another embodiment, the controller 14 provides an alternating current (AC) of decreasing amplitude to the coil over time in which case the coil 16 provides a degaussing function (e.g., becomes a degausser 22) to minimize residual magnetism in nearby equipment. In this example, the amplitude of the current approaches zero over a "period of time" as the current oscillates back and forth, for example, typically in the range of about 10 Hz-1 kHz. Advantageously, this embodiment prevents stray magnetic flux emissions, even at substantially lower levels, from interfering, for instance, with performance of electronics and, in yet other applications, for example, fiber optics communications and link. Thus, this embodiment may prevent stray magnetic flux introducing output changes, drift, or noise into electronic components, which can corrupt data signals in an electronic device. Furthermore, the degaussing function may reduce or eliminate magnetic disturbances in devices to magnetic fields. Specific examples of devices sensitive (e.g., sensitive equipment) to magnetic disturbances include spectrometers, magnetometers, and the like.

Referring to FIGS. 2 and 3, the diagram illustrates a magnetic printed circuit board (PCB) having loops of conductive material that form a conductive coil (e.g., electrical coil 160 that is an example of electrical coil 16 of FIG. 1) in accordance with an embodiment of the present application. In this embodiment, the printed circuit board 130 (PCB 130) comprises a multi-layer printed circuit board 140 formed of layers 142, 144, 146, and 148. In the illustrated embodiment, the multi-layer printed circuit board 140 comprises four layers; however, it should be understood that the quantity of layers may be otherwise increased or decreased to accommodate various coil formation quantities, properties, and magnetic field generation applications. Additionally, it should be understood that multi-layer printed circuit board 140 may be replaced by one or more discrete single-layer printed circuit boards, where each of these boards has one or more coil formations disposed thereon for generating the magnetic field.

In the illustrated embodiment, the conductive traces 132, 134, 136, and 138 are formed on one or more layers of the multi-layer printed circuit board 140 to form electrical coils. As used herein, a "conductive trace" may include either a trace formed on a single layer of the multi-layer printed circuit board 140 or a continuous conductive path extending to a plurality of layers of the multi-layer printed circuit board 140 or sides of a single layer of the multi-layer printed circuit board 140. For example, the conductive traces 132, 134, 136, and 138 may extend about each side of a single layer of the multi-layer printed circuit board 140 or may extend to a plurality of layers of the multi-layer printed circuit board 140 to form a coil (e.g., coil 16 in FIG. 1). In the illustrated embodiment, the multi-layer printed circuit board 140 comprises relatively continuous traces 132, 134, 136, and 138 extending spirally in layers 142, 144, 146, and 148 along the multi-layer printed circuit board 140. As illustrated in the FIG. 3 example, the current travels counterclockwise (indicated by direction of arrows) to produce a magnetic field "out" of the printed circuit board 130. In another variant of FIG. 3, the current may travel clockwise (in opposite direction of arrows in FIG. 3) to produce a magnetic field "into" the printed circuit board 130.

However, it should be understood that the electrical coil 160 may be formed using a plurality of discrete conductive traces 132, 134, 136, and 138 extending along the multi-layer printed circuit board 140 about either a single layer or multiple layers of the multi-layer printed circuit board 140. For example, a plurality of discrete conductive traces 132 may be formed spaced apart from each other on the multi-layer printed circuit board 140. Each of the traces 132, 134, 136, 138 in the above-described example may extend about a single layer or multiple layers of the multi-layer printed circuit board 140 to form a plurality of discrete "coil segments" such that each "coil segment" comprises a conductive path forming an almost complete flattened spiral path within the layer or layers. Thus, together, the plurality of discrete conductive traces 132, 134, 136, and 138 form conductive coils extending along the multi-layer printed circuit board 140. Furthermore, advantageous, the layout of heating coil "traces" may be disposed or laid out in single or multiple layers of one or more circuit boards (e.g., PCBs).

In one application of the present disclosure, multiple "heating circuits" may be disposed side-by-side on a same PCB board (e.g., same circuit card) to provide redundant set(s) of heating circuits. Advantageously, this redundancy would prevent loss of heating capability upon failure of one or more sets of heating circuits. In this example, both primary (main) and redundant circuits may be controlled by a single temperature sensor (e.g., sensor 188 a-f); however, for effective application, electrical current or power to the main and redundant circuit may be driven by independent or separate power sources so as to provide this a fail safe and failure operability capability. In yet another embodiment, referring to most notably to FIG. 5, one or more of the faces (faces 1-6) may be designated a primary (main) or redundant circuit (e.g., circuitry such as coil 160 on multi-layer circuit board 140) and if one face fails (e.g., main or redundant), a failing face of PCB 130 may be deactivated (powered-down) and non-failing face inputs received from its designated sensor (e.g., one or more sensors 188a-f) may be used to compensate for outputs (e.g., magnetic flux generation, heating, and/or degaussing) of one or more failing face(s) (faces 1-6)).

As best illustrated in FIGS. 2 and 3, a coil 160 is formed extending across multiple layers 142, 144, 146, and 148 of a substrate material (e.g., phenolic, silicon, duroid, alumina) by deposition of the conductive traces 132, 134, 136 and 138 (e.g., copper metal traces). In this example, the conductive traces 132, 134, 136, and 138 extend along layers 142, 144, 146, and 148, respectively and extending between layers 142, 144, 146, and 148 through connecting vias 152, 154, 156, and 158, with coil 160 beginning at pad 162 and terminating at pad 164 connected to controller 14 to receive inputs from sensor 188 (e.g., sensors 188 a-f).

It should be understood that the routing of the conductive traces 132, 134, 136 and 138 connecting vias 152, 154, 156, and 158 between the various layers of the multi-layer printed circuit board 140 is exemplary only and may be otherwise modified. Additional layers may be used to form additional conductive traces or may be used to provide multi-layer printed circuit board 140 symmetry. Other layers without conductive electrical coil traces may also be present in multi-layer printed circuit board 140. The layers 142, 144, 146, and 148 may also provide a location for additional signal circuitry and electronic component attachment to the multi-layer printed circuit board 140.

Figure 5:
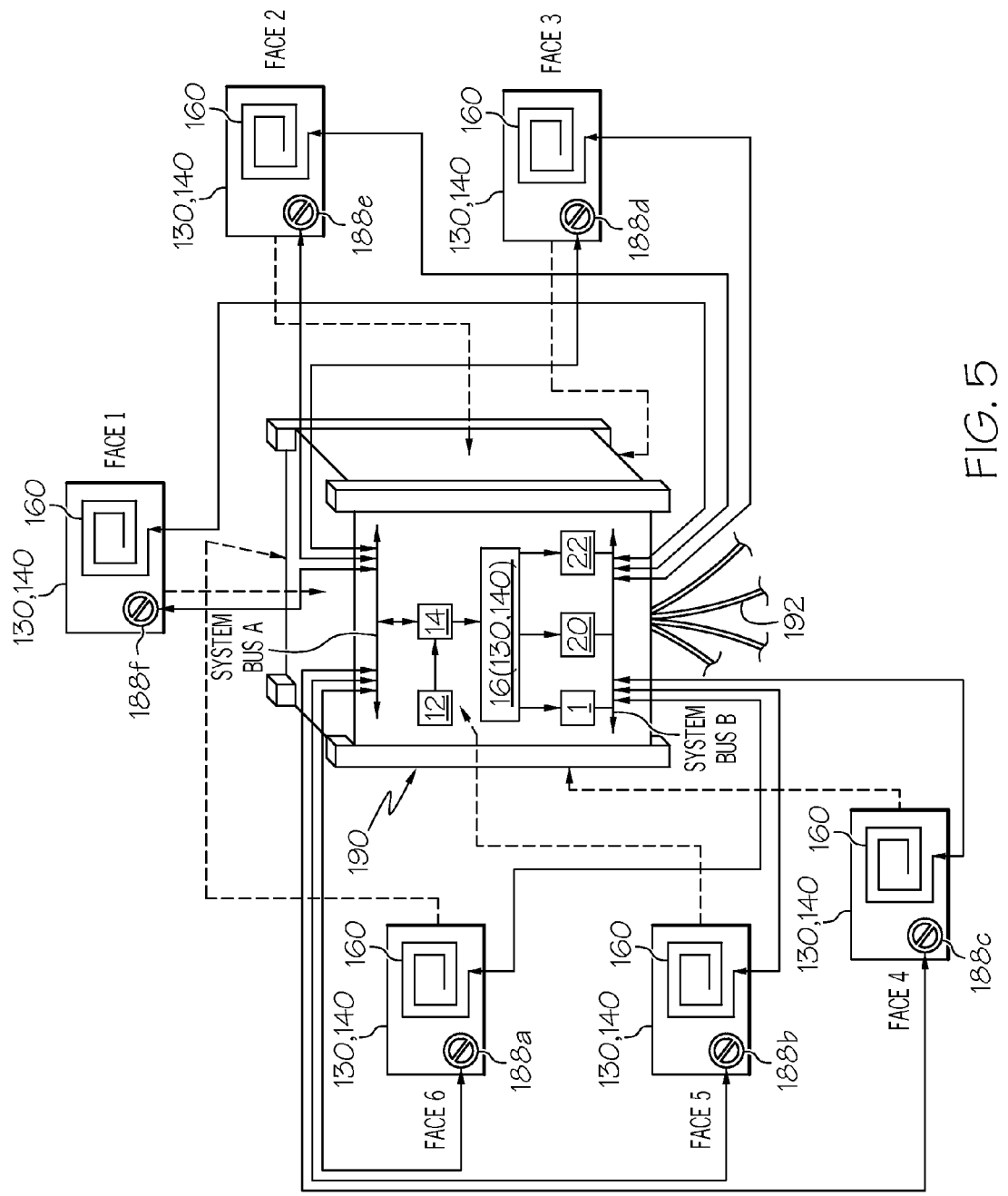
FIG. 5 is a diagram illustrating display of the system illustrated in FIGS. 1-3 on a mobile platform in orbit with PCB's 130 de-attached from the mobile platform to highlight structure aspects.

In operation, the controller 14 couples to the coils (e.g., the coil 160) of the printed circuit board 130. The controller 14 selectively energizes and de-energizes each of the coil(s) of the printed circuit board 130 to function as a flux generator 18, heater 20 and/or degausser 22. The controller 14 may also control an amplitude and direction of the current generated in each of the coils to provide for the desired function. For example, passing a current through the coil 160 generates a magnetic field that interacts with the earth's magnetic field resulting in forces and torques acting on a satellite. Referring to FIG. 5, the satellite 190 is equipped with the printed circuit board 130 described herein. In this variant, the satellite 190 includes at least one PCB for each face (e.g. 6 faces) of the satellite 190.

Figure 4:
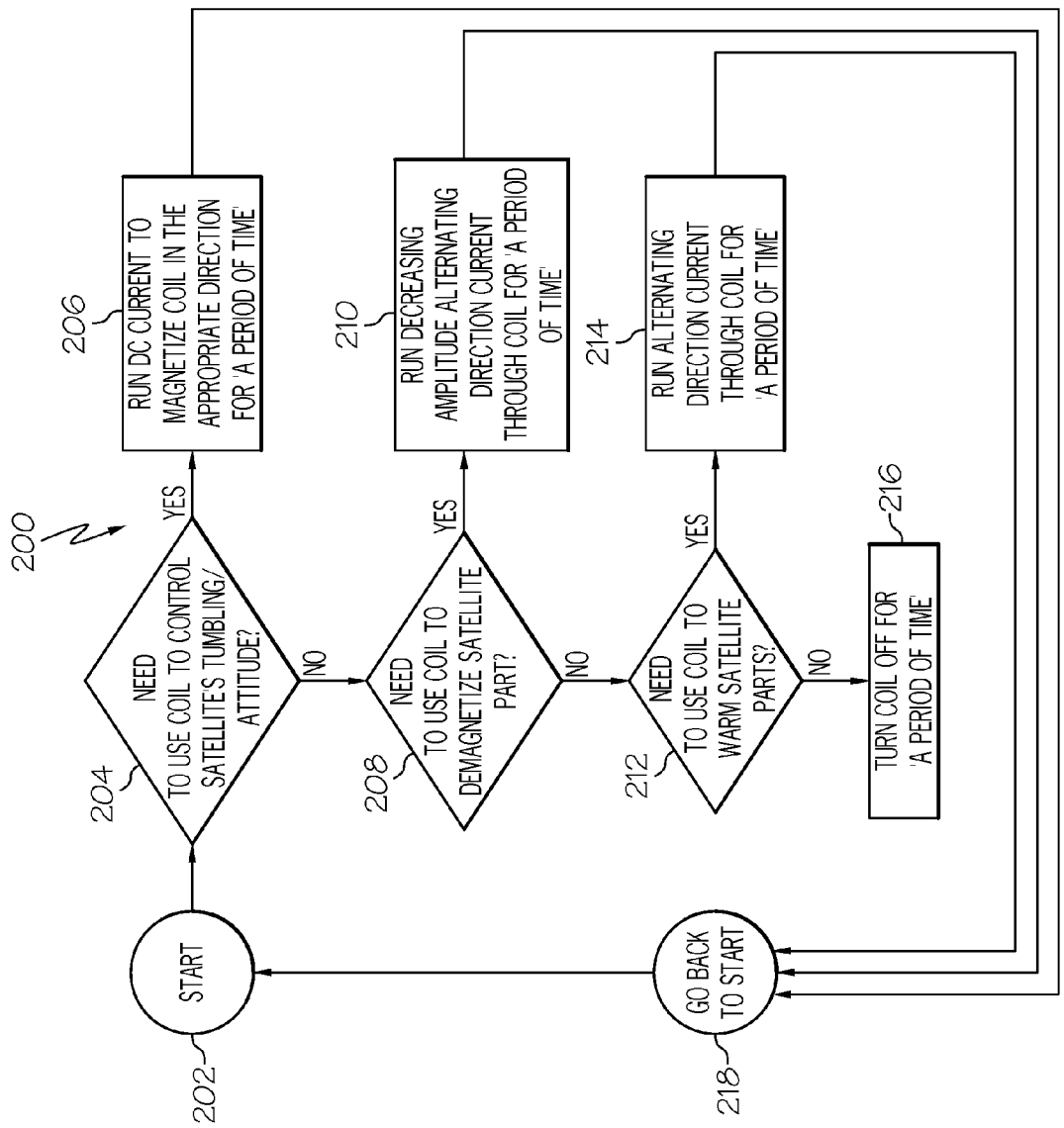
FIG. 4 is a flow chart illustrating a decision matrix for driving a set of coils in accordance with an embodiment of the present disclosure.

Referring to flowchart of FIG. 4, a flowchart 200 illustrates principles of the present application, for instance, a method for operating the coil 16, 160 illustrated in FIGS. 1-3 and 5.

In one or more embodiments, "a period of time" depends on the satellite's control needs, which are, for instance, evaluated at regularly set or one or more control intervals. In one example, the control interval may be no faster than any half-cycle of alternating-direction current in a coil; however, it may be slower. For the heating use, the current direction must alternate fast enough (typically from about a tenth of a Hz up to a few kilohertz) so that any resultant wobble it produces in the mobile platform (e.g., satellite's orientation) due to, for instance, interaction with the earth's magnetic field is reduced or diminished.

In one exemplary degaussing instance, a similar "negligible wobble" constraint applies and in addition, the frequency and the decreasing of an amplitude of the applied current covers a sufficient range to provide a magnetic field strong enough to degauss or at least reduce magnetization in many sensitive parts or sensitive equipment on the satellite that are of concern. Other details for operation, such as the amplitude and frequency, depend greatly on the proximity of the sensitive component(s) or sensitive equipment to the coil, the configuration of the coil such as number of coils and dimensions of each coil, and the like. For instance, typical maximum currents might be a few hundred milli-amperes to a few amperes, alternating at a few tens of Hertz to a kilo Hertz, and decreasing from maximum amplitude to zero over a few tenths of a second to a few seconds.

Referring to FIG. 4, following step 202 (start), in step 204, determine if the satellite 190 is tumbling. If answer is yes for step 204, then go to step 206 to run DC current to magnetize the coil 16 in the appropriate direction for "a period of time" and go back to start (step 218). If answer is no to step 204, then go to step 208 and determine whether there is a need to use the coil 16 to de-magnetize satellite parts (e.g., spectrometers, magnetometers, and the like). In one variant, the coil 16 provides a reduction of or diminished interactions, for example, for these components, within a mobile platform (e.g., satellite 190) due to the earth's magnetic field to a fraction of a degree or less, which reduction may depend, for instance, on the pointing accuracy required for the mobile platform intended usage. If the answer is yes for step 208, then go to step 210 to run decreasing amplitude alternating current though the coil 16 for "a period of time" and go back to start (step 218).

If the answer is no for step 208, then go to step 212 to determine if there is a need to warm satellite parts. If the answer is yes for step 212, then go to step 214 to run alternating current through the coil 16 for "a period of time" and go back to start step 218. For example, the amplitude of the current may be set to produce the desired heating power (typically a few watts) to warm the satellite parts. For instance, the heating power may be based on the square of the RMS (root mean squared) current through the coil 16, which equals the heating power divided by the coil's resistance. If the answer is no for step 212, then turn off the coil 16 for "a period of time" and go back to start (step 218).

Figure 6:
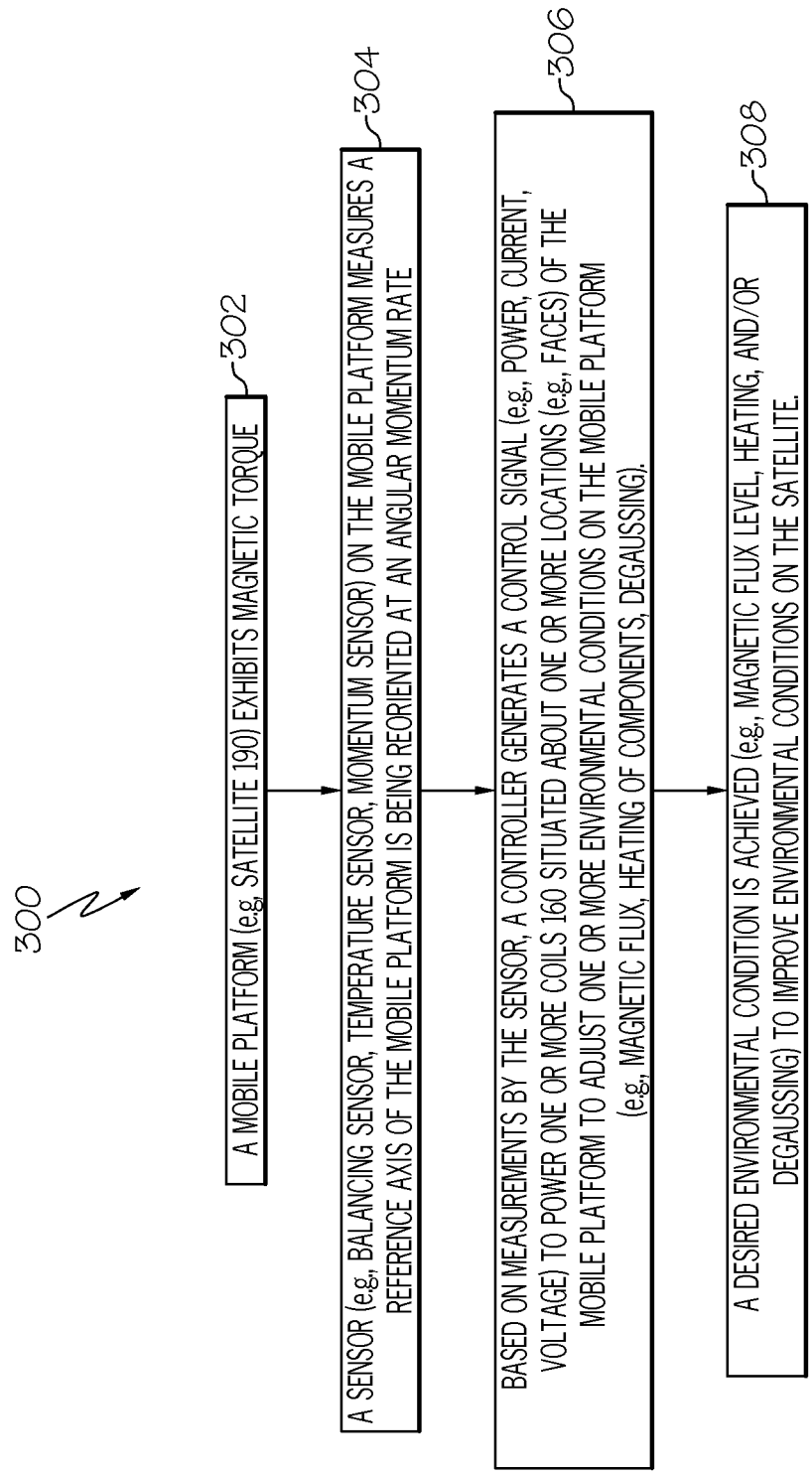
FIG. 6 is a method of FIGS. 1-5 for driving a set of coils in accordance with an embodiment of the present disclosure.

Referring to FIG. 6, an exemplary method is disclosed illustrating the apparatus and system disclosed in FIGS. 1-5. In step 302, a mobile platform (e.g., satellite 190 having communication antenna 192) exhibits magnetic torquing. In step 304, a sensor 188 (188a-f) (e.g., balancing sensor, temperature sensor, momentum sensor, or the like) on the mobile platform measures data, for instance, information on a reference axis of the mobile platform and how the mobile platform is being reoriented, for instance, at an angular momentum rate and communicates the information to system bus A (e.g., communication interface). In step 306, based on data measurement by the sensor 188 (188a-f) from system bus A (e.g., communication interface), a controller 14 generates a control signal (e.g., power, current, voltage) that is communicated, for instance, through system bus B, to power one or more coils 160 (e.g., one or more multi-layer printed circuit board(s) 140 disposed on PCB(s) 130) situated about one or more locations (e.g., faces 1-6) of the mobile platform to adjust one or more environmental conditions on the mobile platform (e.g., magnetic flux, heating of components, and/or degaussing). In the exemplary embodiment illustrated in FIG. 5, each of the faces is de-attached from the mobile platform so as to illustrate block functionality. In particular, face 1 is a top side of the mobile platform, face 2 is right side of the mobile platform, face 3 is the bottom side of the mobile platform, face 4 is the left side of the mobile platform, face 5 is the front side front side of the mobile platform, and face 6 is the back side of the mobile platform. In step 308, a desired environmental condition is achieved (e.g., magnetic flux level, heating, and/or degaussing) to improve environmental conditions on the mobile platform.

Figure 7:
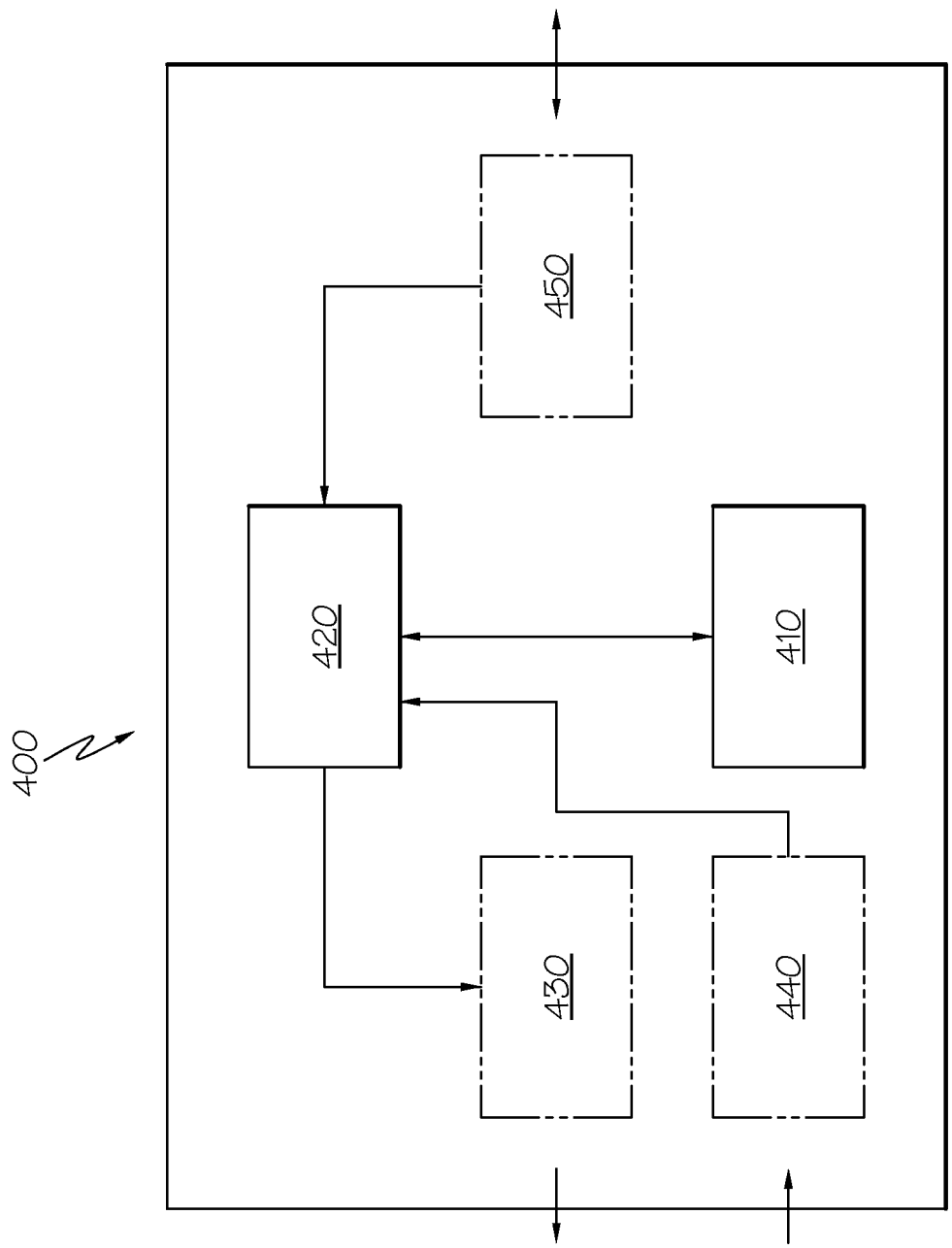
FIG. 7 is a schematic illustration of an exemplary computing device 400 that may be used with methods and systems shown in FIGS. 1-6.

FIG. 7 is a schematic illustration of an exemplary computing device 400 that may be used with systems and methods shown in FIGS. 1-6. In the exemplary embodiment, computing device 400 includes a memory device 410 and a processor 420 coupled to memory device 410 for use in executing instructions. More specifically, in the exemplary embodiment, computing device 400 is configurable to perform one or more operations described herein by programming memory device 410 and/or processor 420. For example, processor 420 may be programmed by encoding an operation as one or more executable instructions and by providing the executable instructions in memory device 410.

Processor 420 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit and/or other programmable circuits.

In the exemplary embodiment, memory device 410 includes one or more devices (not shown) that enable information such as executable instructions and/or other data to be selectively stored and retrieved. In the exemplary embodiment, such data may include, but is not limited to, signal levels, pulse frequencies, pulse durations, pulse sequences, operational data and/or control algorithms. Memory device 410 may also include one or more computer readable media, such as, without limitation, dynamic random access memory (DRAM), static random access memory (SRAM), a solid state disk and/or a hard disk.

In the exemplary embodiment, computing device 400 includes a presentation interface 430 that is coupled to processor 420 for use in presenting information to a user. For example, presentation interface 430 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display and/or a printer. In some embodiments, presentation interface 430 includes one or more display devices.

Computing device 400, in the exemplary embodiment, includes an input interface 440 for receiving input from the user. For example, in the exemplary embodiment, input interface 440 receives information suitable for use with the methods described herein. Input interface 440 is coupled to processor 420 and may include, for example, a joystick, a keyboard, a pointing device, a mouse, a stylus, a touch sensitive panel (e.g., a touch pad or a touch screen) and/or a position detector. It should be noted that a single component, for example, a touch screen, may function as both presentation interface 430 and as input interface 440.

In the exemplary embodiment, computing device 400 includes a communication interface 450 that is coupled to processor 420. In the exemplary embodiment, communication interface 450 communicates with at least one remote device, such as power supply 12, controller 14, coil 16, coil 160, printed circuit board 130, and/or multilayer printed circuit board 140 (shown in FIGS. 1-6). For example, communication interface 450 may use, without limitation, a wired network adapter, a wireless network adapter and/or a mobile telecommunications adapter. A network (not shown) used to couple computing device 400 to the remote device may include, without limitation, the Internet, a local area network (LAN), a wide area network (WAN), a wireless LAN (WLAN), a mesh network and/or a virtual private network (VPN) or other suitable communication means.

The embodiments described herein relate generally to systems and methods and, more particularly, to methods and systems for use in transferring data to and/or power through a multipurpose electrical coil. The embodiments described herein enable information to be transferred and, as such, facilitate reducing hardware and space requirements for electrical control and hardware circuitry on a mobile platform. Additionally, the embodiments described herein facilitate decreasing maintenance costs and/or increasing an overall reliability of the structure.

The methods and systems are not limited to the specific embodiments described herein, but rather, components of systems and/or steps of the method may be utilized independently and separately from other components and/or steps described herein. Each method step and/or each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of using a coil of conductive traces, wherein the coil is located in a mobile platform, the method comprising:
   energizing the coil in accordance with at least two of the following steps:
   a) providing a controller that provides direct current to the coil to generate magnetic flux, wherein passing the direct current through the coil generates torque to orient the mobile platform;
   b) providing alternating current to the coil to generate heat with the current cycling at a frequency sufficient such that average magnetic flux is negated over a period of time; and
   c) providing alternating current of decreasing amplitude to the coil to provide degaussing, wherein the alternating current of decreasing amplitude approaches zero over a fixed time.

2. The method of claim 1 wherein the mobile platform is a satellite.

3. The method of claim 2 including step a), wherein step a) provides torque to orient said satellite.

4. The method of claim 2 wherein said satellite includes magnetically sensitive equipment and step c provides degaussing of said equipment.

5. The method of claim 2 wherein the satellite comprises a printed circuit board and the printed circuit board comprises the coil.

6. The method of claim 5 wherein the satellite comprises a plurality of printed circuit boards and coils.

7. The method of claim 1 including each of steps a), b) and c).

8. The method of claim 1 wherein the conductive traces are formed on a printed circuit board.

9. The method of claim 8 wherein the conductive coil comprises a plurality of discrete conductive traces extending along the printed circuit board.

10. A system for a mobile platform, comprising:
    an electrical coil,
    a power supply for the electrical coil, and
    a controller wherein the controller is programmed to operate the electrical coil as at least two of:
    a) a magnetic flux generator, wherein the controller provides direct current to the electrical coil to generate magnetic flux, wherein passing the direct current through the electrical coil generates torque to orient the mobile platform;
    b) a heater, wherein the controller provides alternating current to the electrical coil to generate heat with the current cycling at a frequency sufficient such that average magnetic flux is negated over a period of time; and
    c) a degausser, wherein the controller provides alternating current of decreasing amplitude to the electrical coil to provide degaussing, wherein the alternating current of decreasing amplitude approaches zero over a fixed time.

11. The system of claim 10 wherein the electrical coil comprises conductive traces formed on a printed circuit board.

12. The system of claim 11 wherein the electrical coil comprises a plurality of discrete conductive traces extending along the printed circuit board.

13. The system of claim 10 wherein the controller is programmed to operate the electrical coil as a magnetic flux generator, a heater and a degausser.

14. A method of operating a mobile platform, the method comprising:
    providing a mobile platform comprising a sensor, a controller and a printed circuit board having formed thereon an electrical coil;
    generating a control signal from the controller based on data from the sensor to power the coil in accordance with at least two of the following steps:
    a) providing direct current to the electrical coil by the controller to generate magnetic flux, wherein passing the direct current through the coil generates torque to orient the mobile platform;
    b) providing alternating current to operate the electrical coil as a heater with the current cycling at a frequency sufficient such that average magnetic flux is negated over a period of time; and
    c) providing alternating current of decreasing amplitude to the magnetic coil to provide degaussing, wherein the alternating current of decreasing amplitude approaches zero over a fixed time.

15. The method of claim 14 wherein the mobile platform further comprises a computing device including a memory device and a processor coupled to the memory device wherein the computing device is configurable to generate the control signal from the controller based on data from the sensor.

16. The method of claim 14 wherein the electrical coil comprises a plurality of discrete conductive traces extending along the printed circuit board.

17. The method of claim 14 including each of steps a), b) and c).

* * * * *